(12) United States Patent
Vuornos

(10) Patent No.: US 10,511,454 B2
(45) Date of Patent: Dec. 17, 2019

(54) METHODS AND SYSTEMS FOR IMPLEMENTING DIFFERENTIAL PRICING CONFIGURATIONS

(71) Applicant: FACEBOOK, INC., Menlo Park, CA (US)

(72) Inventor: Lauri Vuornos, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 259 days.

(21) Appl. No.: 15/455,023

(22) Filed: Mar. 9, 2017

(65) Prior Publication Data
US 2018/0262354 A1 Sep. 13, 2018

(51) Int. Cl.
*H04L 12/14* (2006.01)
*G06Q 20/16* (2012.01)
*H04M 15/00* (2006.01)
*G06Q 50/00* (2012.01)

(52) U.S. Cl.
CPC ......... *H04L 12/1496* (2013.01); *G06Q 20/16* (2013.01); *H04L 12/141* (2013.01); *H04L 12/1414* (2013.01); *H04L 12/1425* (2013.01); *H04L 12/1442* (2013.01); *H04L 12/1446* (2013.01); *H04M 15/70* (2013.01); *H04M 15/71* (2013.01); *H04M 15/72* (2013.01); *H04M 15/721* (2013.01); *H04M 15/723* (2013.01); *H04M 15/80* (2013.01); *H04M 15/8022* (2013.01); *H04M 15/8044* (2013.01); *H04M 15/8055* (2013.01); *H04M 15/8083* (2013.01); *G06Q 50/01* (2013.01); *G06Q 2220/12* (2013.01)

(58) Field of Classification Search
CPC .... G06Q 20/16; G06Q 50/01; G06Q 2220/12; H04L 12/141; H04L 12/1414; H04L 12/1442; H04L 12/1446
See application file for complete search history.

(56) References Cited

U.S. PATENT DOCUMENTS

| | | | | |
|---|---|---|---|---|
| 8,965,330 B2* | 2/2015 | Raj | ................... | H04L 12/1475 455/406 |
| 9,633,381 B2* | 4/2017 | McKerlich | ............. | G06Q 30/04 |
| 2005/0255886 A1* | 11/2005 | Aaltonen | ............... | H04H 20/57 455/558 |
| 2006/0224525 A1* | 10/2006 | Dahlin | ................... | G06Q 30/00 705/80 |
| 2006/0276171 A1* | 12/2006 | Pousti | ................... | G06Q 20/02 455/405 |
| 2007/0250619 A1* | 10/2007 | Li | ...................... | G06F 19/3418 709/224 |

(Continued)

*Primary Examiner* — George C Neurauter, Jr.
(74) *Attorney, Agent, or Firm* — Morgan, Lewis & Bockius LLP

(57) ABSTRACT

Methods for implementing different pricing configurations by a server system are disclosed. The server system provides an application programming interface (API) for one or more network operators and receives, from a network operator via the API, a first request for a pricing configuration for network access for one or more internet protocol (IP) addresses hosted by the network operator. The server system retrieves the pricing configuration and provides a response to the first request to the network operator via the API that includes the pricing configuration.

9 Claims, 9 Drawing Sheets

(56) References Cited

U.S. PATENT DOCUMENTS

| | | | | |
|---|---|---|---|---|
| 2008/0114690 A1* | 5/2008 | Skidmore | H04L 12/14 | 705/52 |
| 2008/0250053 A1* | 10/2008 | Aaltonen | G06Q 30/08 | |
| 2010/0003923 A1* | 1/2010 | McKerlich | H04L 12/14 | 455/67.11 |
| 2010/0131756 A1* | 5/2010 | Schneider | G06F 21/31 | 713/155 |
| 2010/0299419 A1* | 11/2010 | Ramankutty | H04W 24/02 | 709/221 |
| 2012/0233588 A1* | 9/2012 | Mruthyunjaya | G06F 8/30 | 717/105 |
| 2014/0006237 A1* | 1/2014 | Chiang | G06Q 30/04 | 705/34 |
| 2014/0094138 A1* | 4/2014 | Saker | H04L 12/1407 | 455/406 |
| 2014/0143752 A1* | 5/2014 | Rumer | G06F 8/30 | 717/106 |
| 2015/0372923 A1* | 12/2015 | Dunmire | G06Q 10/06 | 709/225 |
| 2016/0132879 A1* | 5/2016 | Howe | G06Q 20/405 | 705/44 |

\* cited by examiner

METHODS AND SYSTEMS FOR IMPLEMENTING DIFFERENTIAL PRICING CONFIGURATIONS

TECHNICAL FIELD

This relates generally to network communications, including but not limited to implementing different pricing configurations by a server system in communication with a network operator.

BACKGROUND

Mobile devices have become an increasingly dominant means through which consumers access, download, and consume electronic content over the Internet. Mobile network operators experience high volumes of calls, texts, video streaming, and other data transferring activities. Consumers are readily spending hours of their day on their mobile devices, consuming data and bandwidth of mobile network operators. Mobile network operators offer different data packages for consumers with different data requirements. For example, third-party services may offer pricing incentives to users of mobile networks to allow greater accessibility to the third-party services.

SUMMARY

Accordingly, there is a need for methods and system to implement different pricing configurations (e.g., including pricing incentives) to users of mobile networks. By accessing an application programming interface (API) for implementing pricing configurations for one or more internet protocol (IP) addresses, mobile network operators can tailor pricing configurations for said IP addresses hosted by the mobile network operator.

In accordance with some embodiments, a computer-implemented method is performed at a server system with one or more processors and memory storing instructions for execution by the one or more processors. The server system provides an API for one or more network operators. The server system receives, from a network operator via the API, a first request for a pricing configuration for network access for one or more internet protocol (IP) addresses hosted by the network operator. The server system retrieves the pricing configuration and provides a response to the first request to the network operator via the API. The response includes the pricing configuration.

In accordance with some embodiments, a server system includes one or more processors and memory storing one or more programs configured to be executed by the one or more processors. The one or more programs include instructions for performing the operations of the above server-side method. In accordance with some embodiments, a non-transitory computer-readable storage medium has stored therein instructions that, when executed by one or more processors of a server system, cause the server system to perform the operations of the above server-side method.

In accordance with some embodiments, a method is performed at a computing system of a network operator. The computing system has one or more processors and memory storing instructions for execution by the one or more processors. The computing system sends, to a server system that is independent of the network operator, via an application programming interface (API) provided by the server system, a first request for a pricing configuration for network access for one or more internet protocol addresses (IP) hosted by the network operator. The computing system receives the pricing configuration from the server system via the API and tests the pricing configuration for the one or more IP addresses.

In accordance with some embodiments, a computing system of a network operator include one or more processors and memory storing one or more programs configured to be executed by the one or more processors. The one or more programs include instructions for performing the operations of the above computing-system-side method. In accordance with some embodiments, a non-transitory computer-readable storage medium has stored therein instructions that, when executed by one or more processors of a computing system of a network operator, cause the computing system to perform the operations of the above computing-system-side method.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first request could be termed a second request, and, similarly, a second request could be termed a first request, without departing from the scope of the various described embodiments. The first request and the second request are both requests, but they are not the same request.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
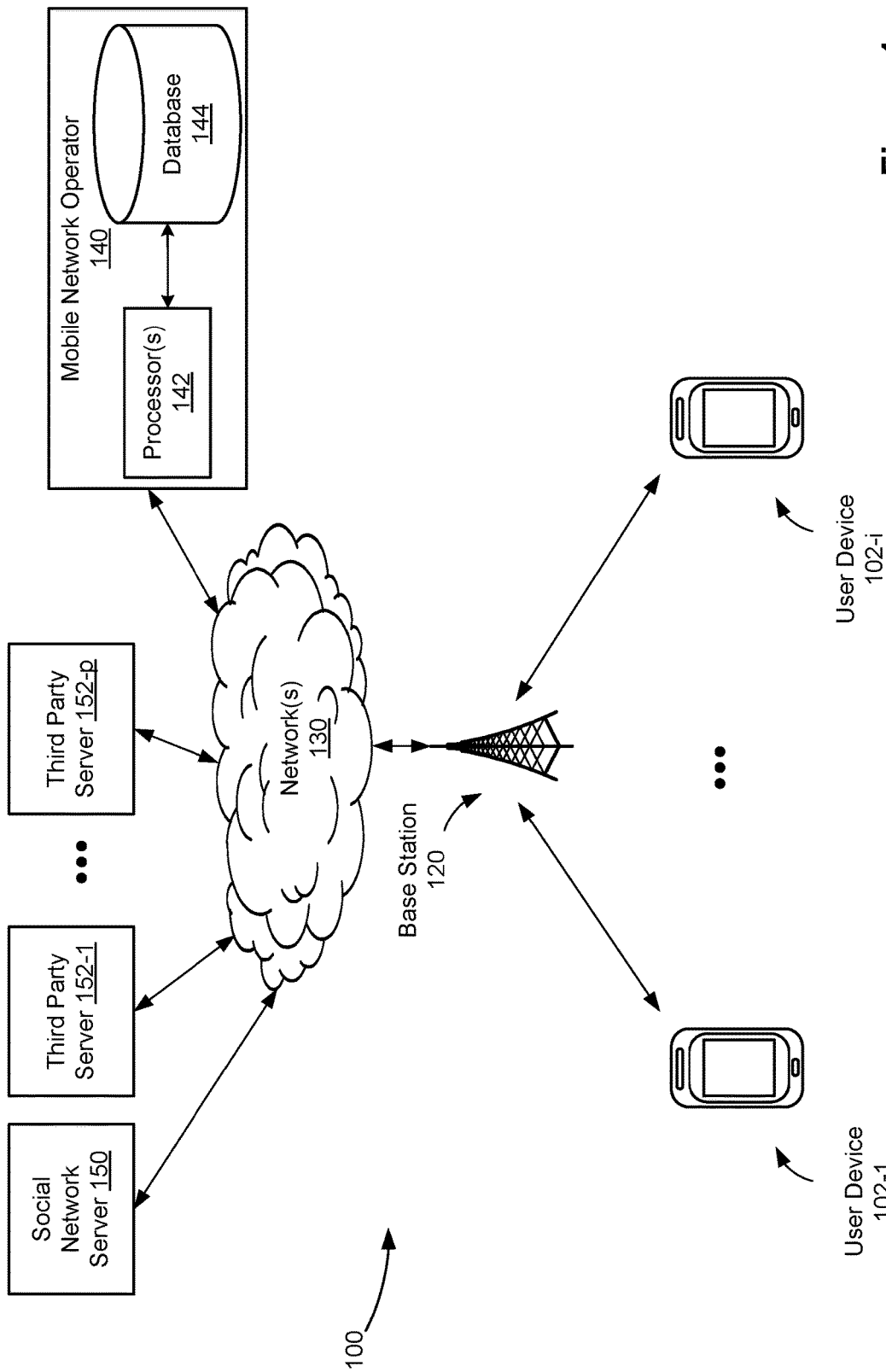
FIG. 1 is a block diagram illustrating a network architecture for providing network services, in accordance with some embodiments.

FIG. 1 illustrates a network architecture 100 in accordance with some embodiments. The network architecture 100 allows one or more subscribers (e.g., users) of Internet service to be provided with one or more pricing configurations. Examples of pricing configurations may include, without limitation, content being free (e.g., zero-rated), available at special pricing configurations, or available at regular pricing configurations. For example, respective pricing configurations are assigned to IP addresses or domain names (e.g., domain addresses, host names, host addresses, URLs), web pages, and/or content types (e.g., text, image, audio, and/or video) associated with one or more web servers that provide Internet content to subscribers. The creation of the pricing configurations may also take into consideration subscriber account types (e.g., pre-paid, having a zero balance, etc.), subscriber phone numbers, subscriber IP addresses, requested content types, applications running on subscriber devices, device location, and/or other device features.

The network architecture 100 routes the traffic between one or more subscriber devices (i.e., user devices) and destination IP addresses using predetermined pricing policies (e.g., free, special pricing configuration, or regular pricing configuration). The network architecture 100 thus provides various products and/or functionalities (e.g., a Free Basics user interface for zero-rated content) to the subscribers.

In some embodiments, a subscriber device can access one or more predetermined IP addresses or one or more predetermined domain names in accordance with predetermined pricing policies. For example, for zero-rating service, a subscriber device can download, upload, and/or view a webpage or use an application associated with a predetermined IP address (or IP addresses) or a predetermined domain name for free, without being charged for network access. Thus these types of predetermined IP addresses or domain names are called "zero-rated." The content from zero-rated web pages and/or applications is called "zero-rated content."

In another example, for specially priced services, a network operator may provide promotions, such as discounted pricing, for accessing certain IP addresses or certain domain names, and/or certain content types (e.g., texts and/or images) from certain IP addresses or certain domain names. The specially priced services may be provided to certain subscribers as selected by the network operator.

In yet another example, for regularly priced services, a subscriber device can access one or more IP addresses or one or more domain names that are not zero-rated or are not specially priced by paying regular service fees. In some embodiments, one or more IP addresses or one or more domain names that are neither zero-rated nor specially priced are treated as regularly priced. The IP addresses or domain names that require paid network access are called "non-zero-rated" and include regularly priced content and/or specially priced content. The content provided by non-zero-rated content providers is called "non-zero-rated content" and includes regularly priced content and/or specially priced content.

The network architecture 100 includes client-side modules (e.g., as discussed with reference to FIG. 4) executed on a number of user devices (also called "client devices," "client systems," "client computers," "subscriber devices," or "clients") 102-1 ... 102-$i$, network-operator-side modules (e.g., as discussed with reference to FIG. 3) executed on a network-operator (e.g., mobile network operator) computing system 140 (e.g., a server system operated by a network operator), and server-side modules (e.g., as discussed with reference to FIG. 2) executed on a social network server system 150 and/or one or more third-party servers 152-1, ... 152-$p$. The user devices 102 communicate with the systems 140, 150, and 152 through one or more networks 130 (e.g., the Internet, cellular telephone networks, mobile data networks, other wide area networks, local area networks, metropolitan area networks, and so on).

In some embodiments, the user devices 102 are mobile devices and/or fixed-location devices. The user devices 102 are associated with subscribers (not shown) who employ the user devices 102 to access one or more IP addresses or domain names (e.g., including zero-rated content providers and/or non-zero-rated content providers). The user devices 102 execute web browser applications and/or other applications that can be used to access the one or more IP addresses or domain names. In some embodiments, a user device 102 processes requests for network services and forwards the requests from the user device 102 to the network-operator computing system 140.

Examples of the user devices 102 include, but are not limited to, feature phones, smart phones, smart watches, personal digital assistants, portable media players, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), wearable computing devices, personal digital assistants (PDAs), enhanced general packet radio service (EGPRS) mobile phones, media players, navigation devices, game consoles, smart televisions, remote controls, combinations of any two or more of these data processing devices or other data processing devices, and/or other appropriate computing devices that can be used to communicate with the network-operator computing system 140.

In some embodiments, the network architecture 100 includes one or more base stations 120 for carrier networks that provide cellular service to the user devices 102. One or more network operators (e.g., network service providers, mobile network operators, network carriers, or cellular companies) own or control the one or more base stations 120 and related infrastructure. For example, the base station 120 communicably connects one or more user devices 102 (e.g., 102-1) to one another (e.g., 102-i) and/or to the networks 130. The base stations 120 route traffic between the networks 130 and the user device 102.

In some embodiments, the network-operator computing system 140 is implemented on one or more standalone computers or on a distributed network of computers. In some embodiments, the network-operator computing system 140 also employs various virtual devices and/or services of third-party service providers (e.g., cloud computing) to provide the underlying computing resources and/or infrastructure resources of the network-operator computing system 140. The network-operator computing system 140 includes one or more processors 142 and one or more databases 144. The one or more processors 142 process requests for respective network services from the user devices 102, and route or forward requests to corresponding web servers 150 and/or 152 to provide the network services with corresponding pricing configurations. In some embodiments, the network-operator computing system 140 is configured to forward or route data between the user devices 102 and the web servers 150 and/or 152 on a zero-rated basis (i.e., for free, at no data charges). In some embodiments, the network-operator computing system 140 is configured to forward or route data between the user devices 102 and the web servers 150 and/or 152 using one or more predetermined pricing configurations. The database 144 stores various information, including but not limited to information related to subscribers and/or pricing configurations.

In some embodiments, the one or more third-party servers 152-1, . . . 152-p include third-party servers configured to provide services separate from social networking functionalities provided by the social network server system 150. In some embodiments, a given third-party server 152 hosts a website that provides web pages to user devices 102. Alternatively or additionally, a given third-party server 152 hosts an application that is used by user devices 102. As discussed above, the network-operator computing system 140 may route or redirect requests from user devices 102 to respective third-party servers 152. In some embodiments, a given third-party server 152 is used to provide third-party content (e.g., news articles, reviews, message feeds, etc.). In some embodiments, a given third-party server 152 is a single computing device, while in other embodiments, a given third-party server 152 is implemented by multiple computing devices working together to perform the actions of a server system (e.g., cloud computing).

In some embodiments, predetermined pricing configurations specify prices for network access to content provided by one or more third-party servers 152 to the user devices 102. For example, the pricing configurations specify prices associated with respective IP addresses or domain names for the one or more third-party servers 152. Different pricing configurations may exist for specific content sources (e.g., pay-per-view, advertisers), specific content formats (e.g., different file formats; different resolution/quality levels), specific content genres (e.g., games, movies, audiobooks), and specific content-distribution times (e.g., peak hours, off-peak hours). Pricing configurations thus specify data-usage fees that user devices 102 pay to a network operator for viewing, downloading, and/or uploading data.

Figure 2:
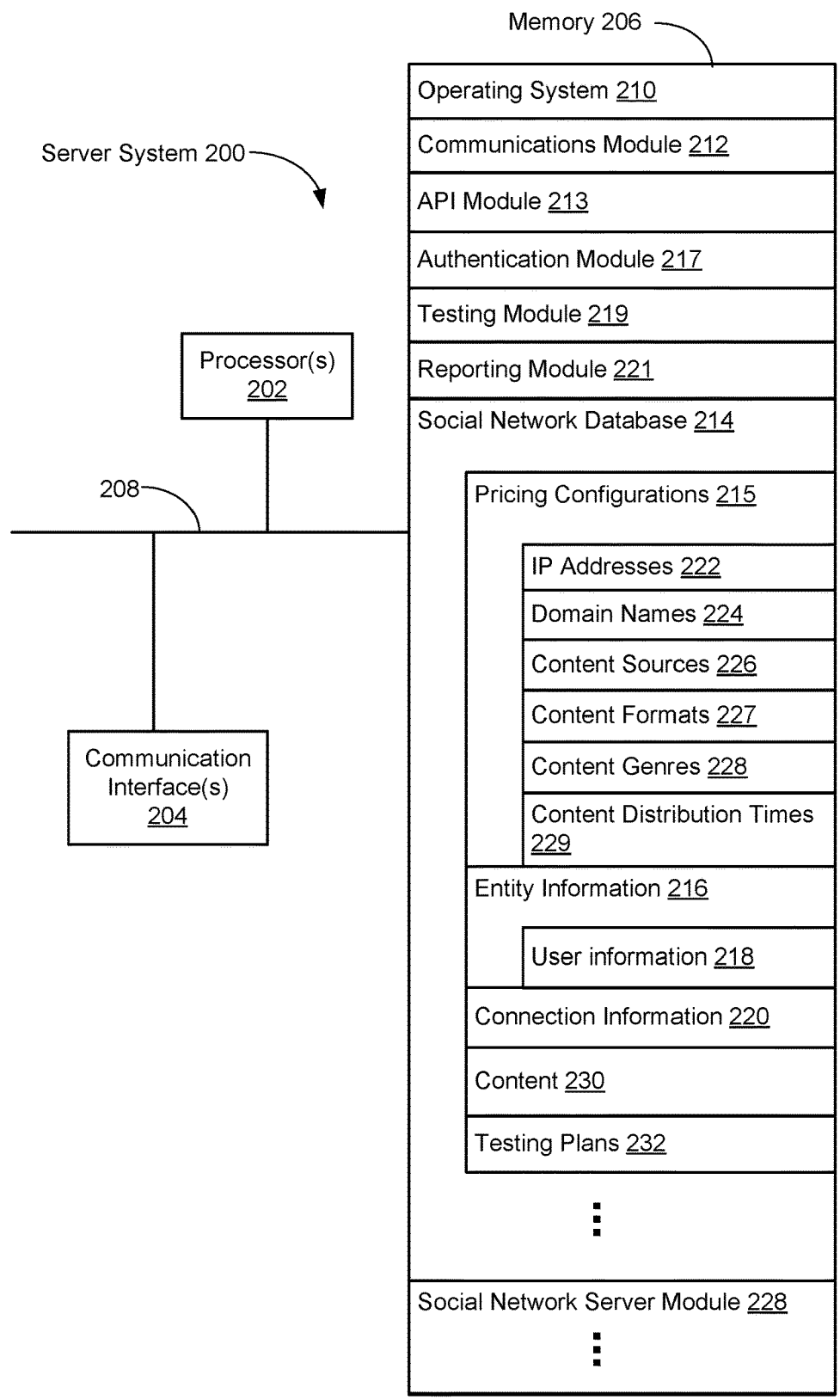
FIG. 2 is a block diagram illustrating an exemplary server system, in accordance with some embodiments.

FIG. 2 is a block diagram illustrating an exemplary server system 200 in accordance with some embodiments. In some embodiments, the server system 200 is an example of a social network server system 150. The server system 200 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 200 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules, and data structures, or a subset or superset thereof:

- an operating system 210 that includes procedures for handling various basic system services and for performing hardware-dependent tasks;
- a network communication module 212 that is used for connecting server system 200 to other computers (e.g., client devices 102-1 . . . 102-i, and/or third-party servers 152) via the one or more communication network interfaces 204 (wired or wireless) and one or more communication networks 130;
- an application programming interface (API) module 213 for communicating with one or more mobile network operators;
- an authentication module 217 for authenticating access to the server system 200 (e.g., to the social network database 214, via the API module 213);
- a testing module 219 for creating testing plans for testing pricing configurations and/or comparing received test results with a predetermined standard;
- a reporting module 221 for monitoring and reporting network activity;
- a social network database 214 for storing data associated with the social networking service, such as:
    - pricing configurations 215, including corresponding IP addresses 222, domain names 224, content sources 226, content formats 227, content genres 228, and/or content distribution times 229;
    - entity information 216, such as user information 218 including profile pictures 238 and other pictures 240;
    - connection information 220; and
    - user content 230; such as posts and advertisements;
    - testing plans 232; and
- a social network server module 228 for providing social networking services and related features.

The social network database 214 stores data associated with the server system 200 in one or more types of databases, such as graph, dimensional, flat, hierarchical, network, object-oriented, relational, and/or XML, databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at user devices 102 on corresponding profile pages or other pages in the social networking service. In some embodiments, the nodes also include pointers or references to other objects, data structures, or resources for use in rendering content in conjunction with the rendering of the pages corresponding to the respective nodes at user devices 102.

Entity information 216 includes user information 218, such as user profiles, user profile pictures, other pictures associated with the user (e.g., images where the user has been tagged or identified by image analysis software), a plurality of icons, login information, payment credentials (e.g., credit-card or debit-card information, bank information, etc. for conducting financial transactions through the social networking service), privacy and other preferences, biographical data, and the like. In some embodiments, for a given user, the user information 218 includes the user's name, profile picture, a plurality of icons, contact information, birth date, sex, marital status, family status, employment, education background, preferences, interests, and/or other demographic information.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. For example, entity information 216 may include a location tag (e.g., Lake Tahoe, Calif., USA) for one or more digital photos. In some embodiments, the resource is located in the social network server system 200 or on an external server, such as a third-party server (e.g., third-party server 152-p).

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes (e.g., a contact).

In some embodiments, an edge includes or represents one or more data objects or attributes that correspond to the relationship between a pair of nodes. For example, when a first user indicates that a second user is a "friend" of the first user, the social network server system 150 transmits a "friend request" to the second user. If the second user confirms the "friend request," the social network server system 150 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information 220 about a particular action or activity performed by a user of the user node towards the other entity node. For example, a user may "like" or have "attended," "played," "listened," "cooked," "worked at," "watched," etc. the entity at the other node. The page in the social networking service that corresponds to the entity at the other node may include, for example, a selectable "like," "check in," "add to favorites," etc. icon. After the user clicks one of these icons, the social network system 108 may create a "like" edge, "check in" edge, a "favorites" edge, etc. in response to the corresponding user action. As another example, the user may listen to a particular song using a particular application (e.g., an online music application). In this case, the social network system 108 may create a "listened" edge and a "used" edge between the user node that corresponds to the user and the entity nodes that correspond to the song and the application, respectively, to indicate that the user listened to the song and used the application. In addition, the social network system 108 may create a "played" edge between the entity nodes that correspond to the song and the application to indicate that the particular song was played by the particular application.

In some embodiments, content 230 includes text (e.g., ASCII, SGML, HTML), images (e.g., jpeg, tif and gif), graphics (e.g., vector-based or bitmap), audio, video (e.g., mpeg), other multimedia, and/or combinations thereof. In some embodiments, content 230 includes executable code (e.g., script for API calls), podcasts, links, and the like.

In some embodiments, testing plans 232 include one or more tests to verify that pricing configurations are properly implemented (e.g., that the set of test results complies with a standard). The testing plans 232 may, for example, verify pricing by user IP address, content-source IP address or domain name, content source, content format, content genre, and/or content distribution time.

Figure 3:
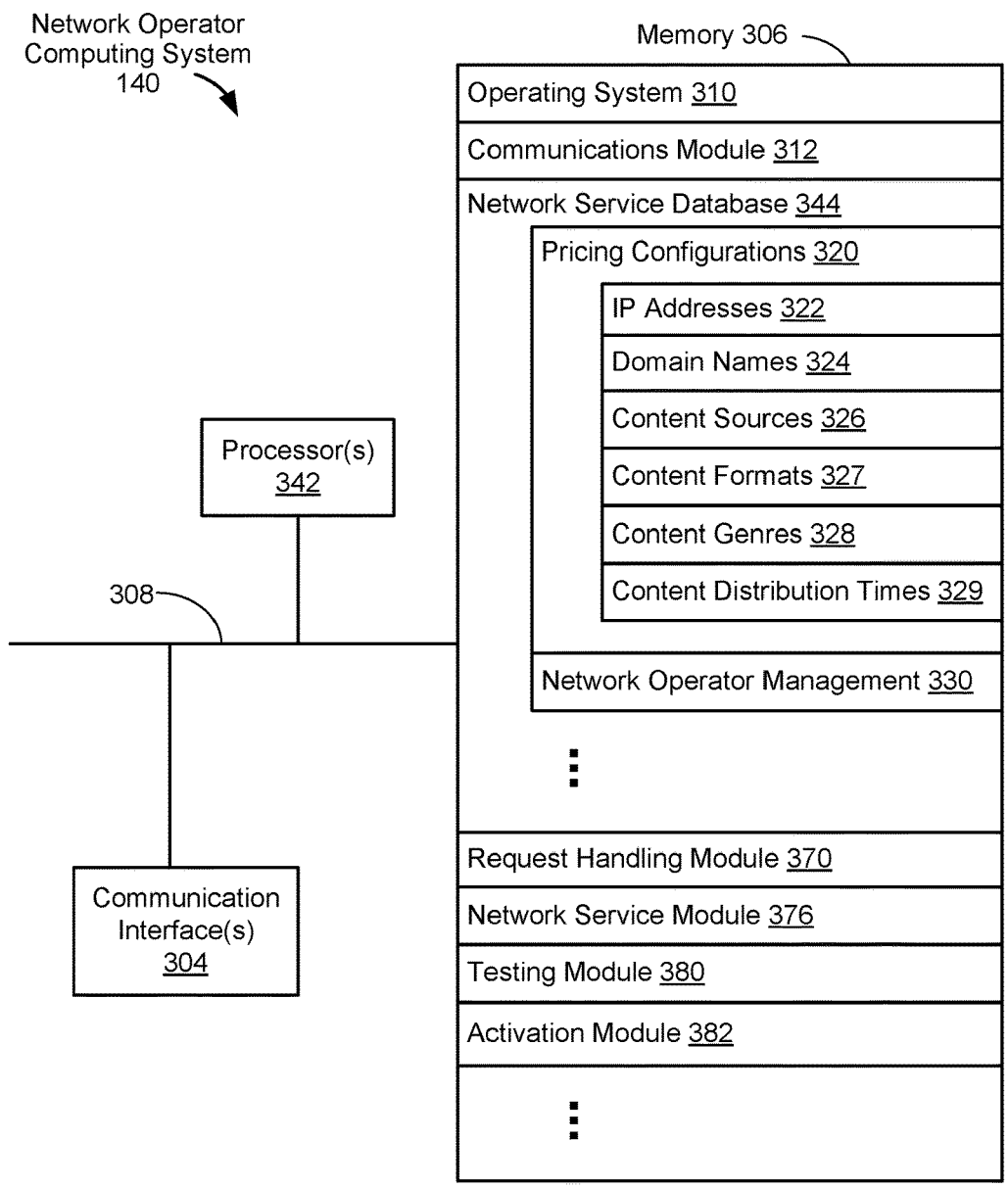
FIG. 3 is a block diagram illustrating an exemplary mobile network server system, in accordance with some embodiments.

FIG. 3 is a block diagram illustrating an exemplary network operator (e.g., mobile network operator) computing system 140 (FIG. 1) in accordance with some embodiments. The network-operator computing system 140 includes one or more processing units (processors or cores) 342, one or more network or other communications interfaces 304, memory 306, and one or more communication buses 308 for interconnecting these components. The communication buses 308 optionally include circuitry (sometimes called a chipset) that interconnects and controls communications between system components. The network-operator computing system 140 optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Figure 4:
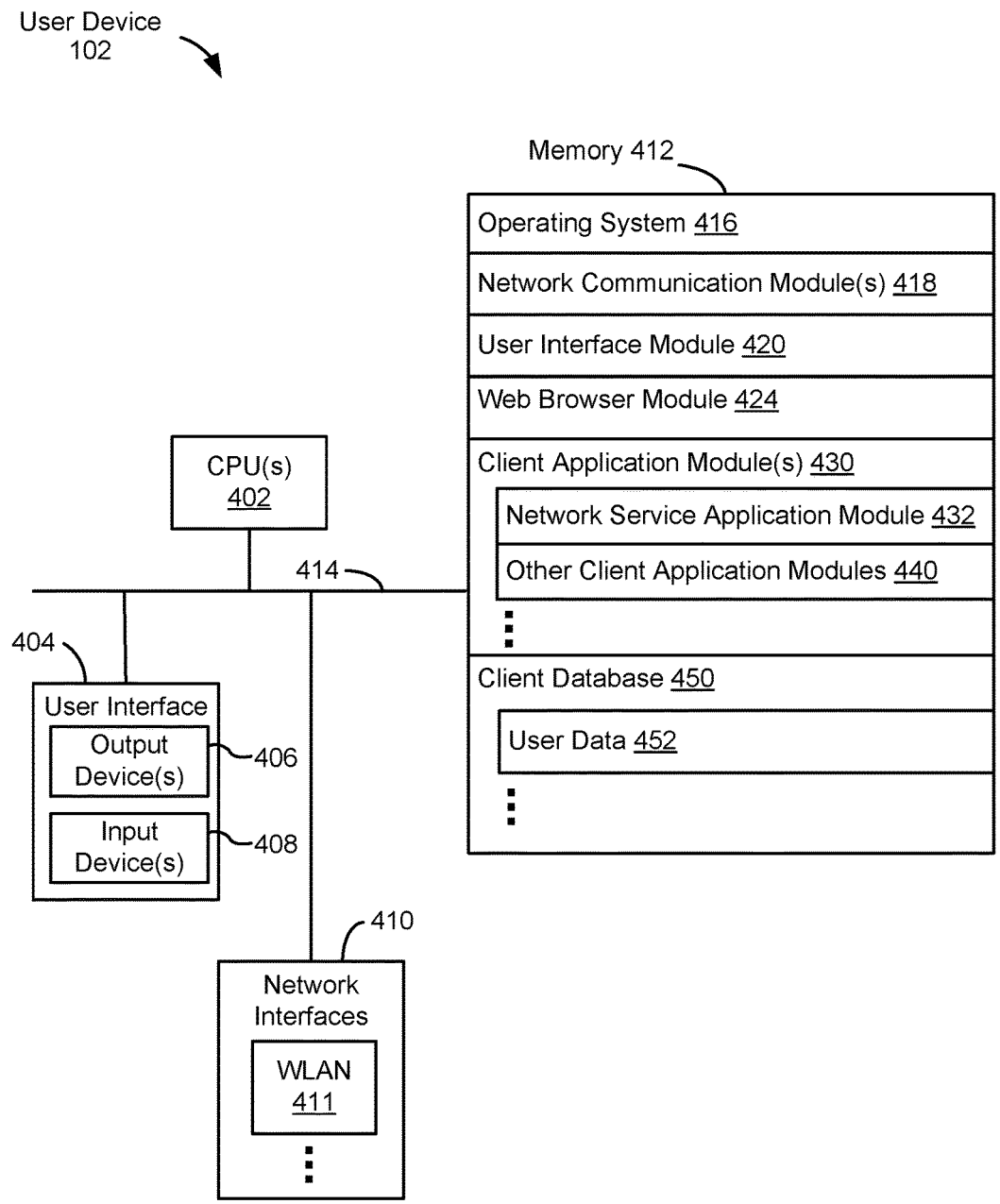
FIG. 4 is a block diagram illustrating an exemplary user device, in accordance with some embodiments.
Figure 5A:
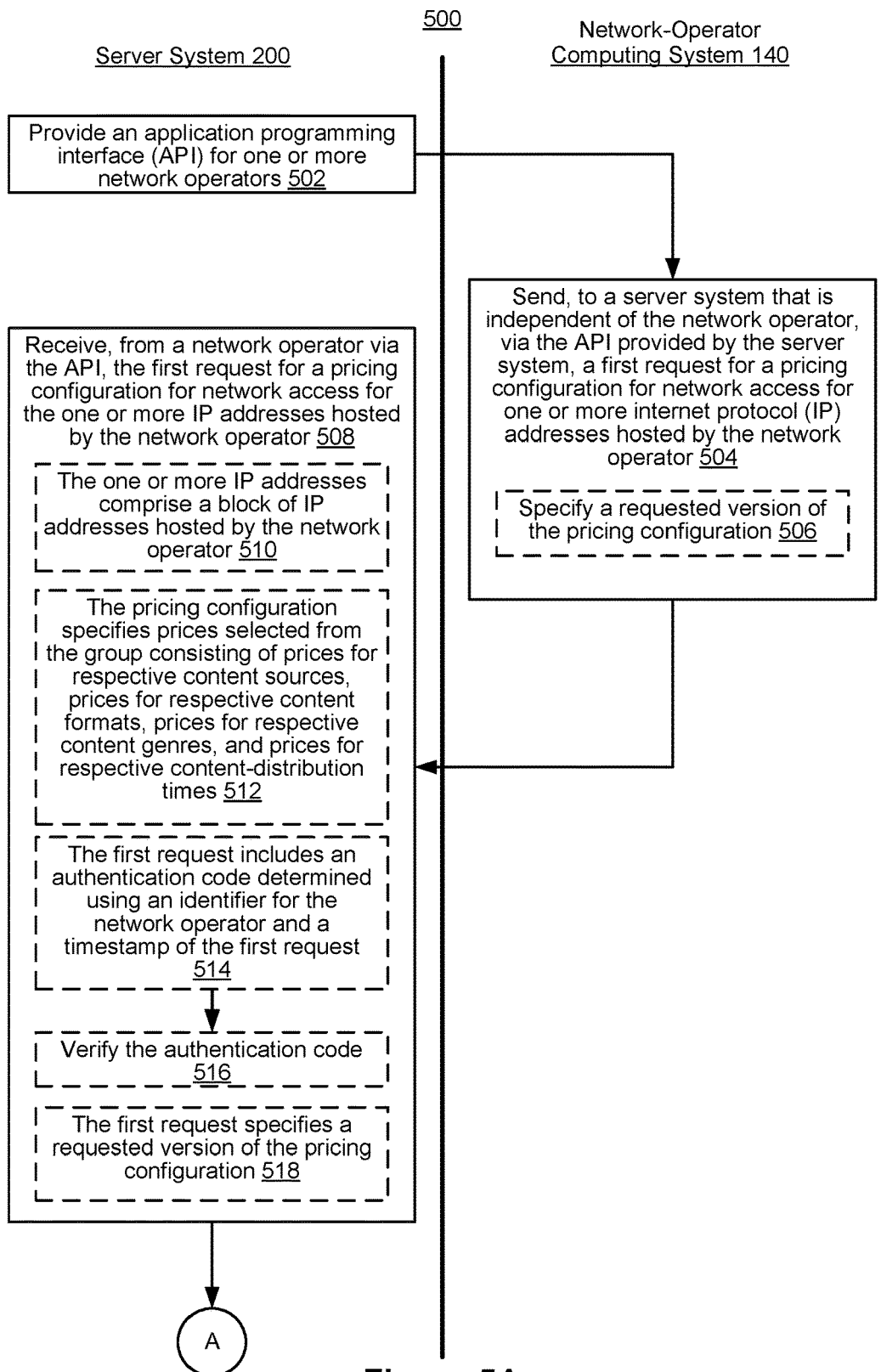
FIGS. 5A-5E are flow diagrams illustrating a method for implementing differential pricing configurations, in accordance with some embodiments.
Figure 5B:
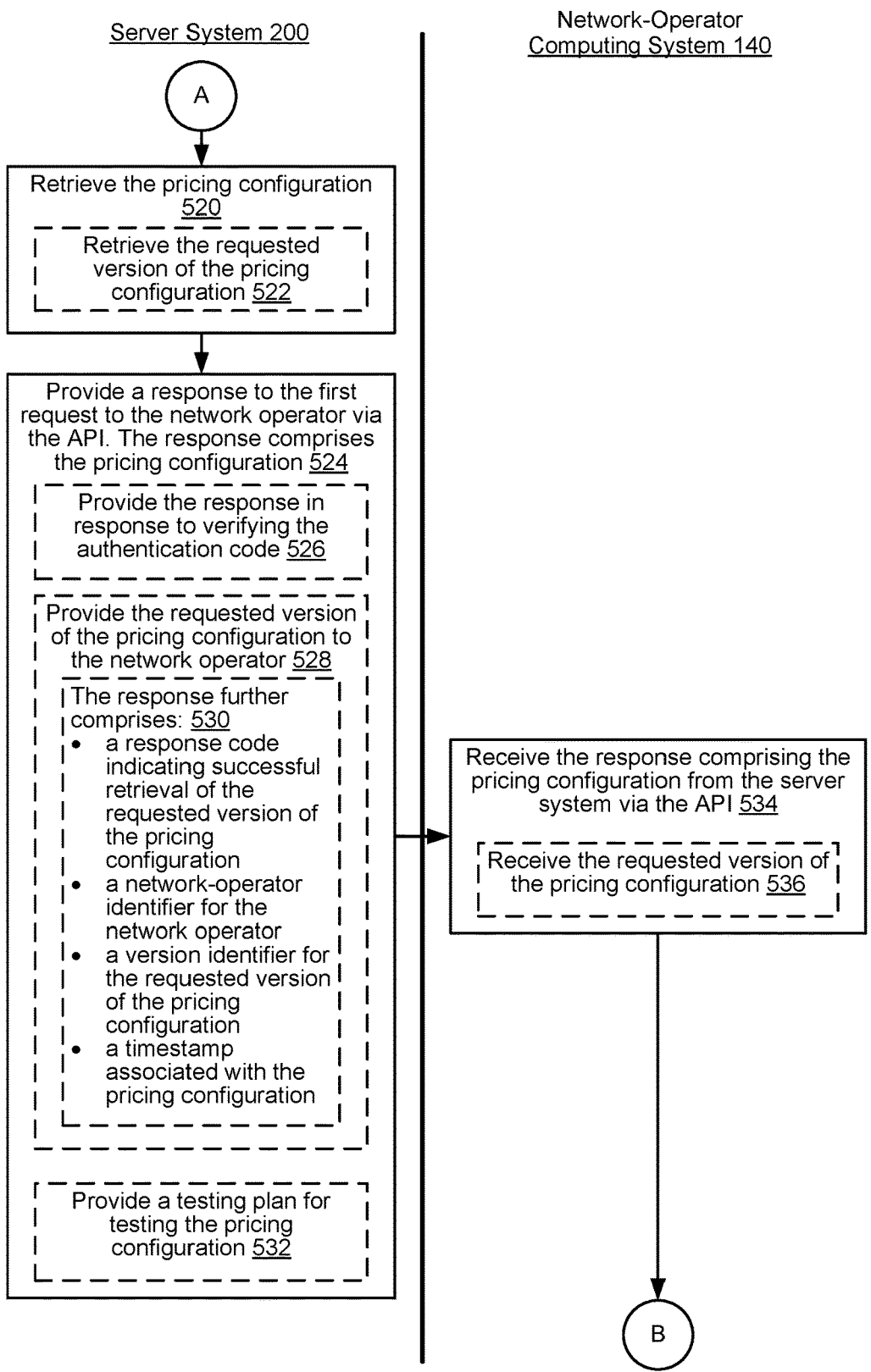
Figure 5C:
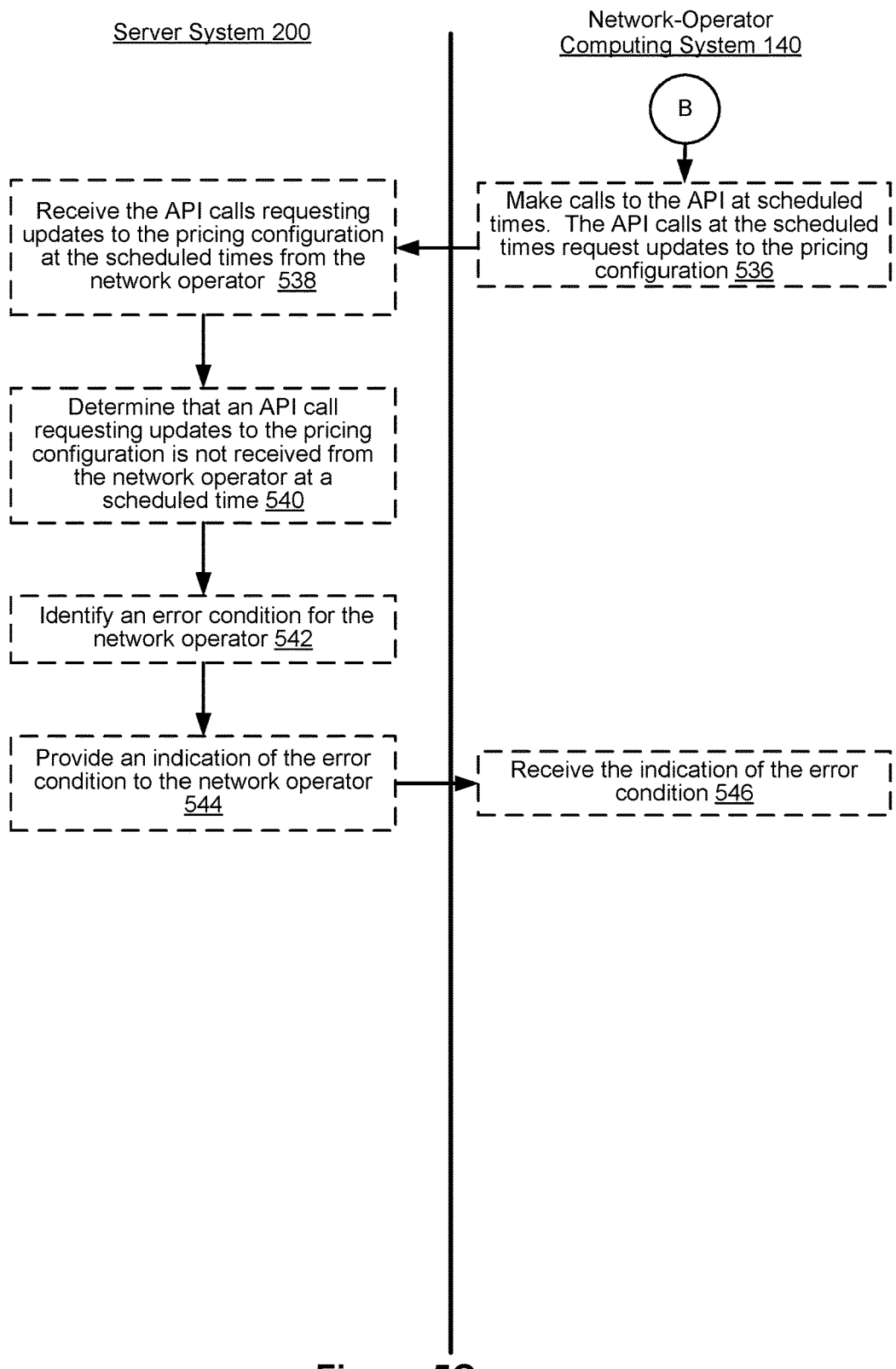
Figure 5D:
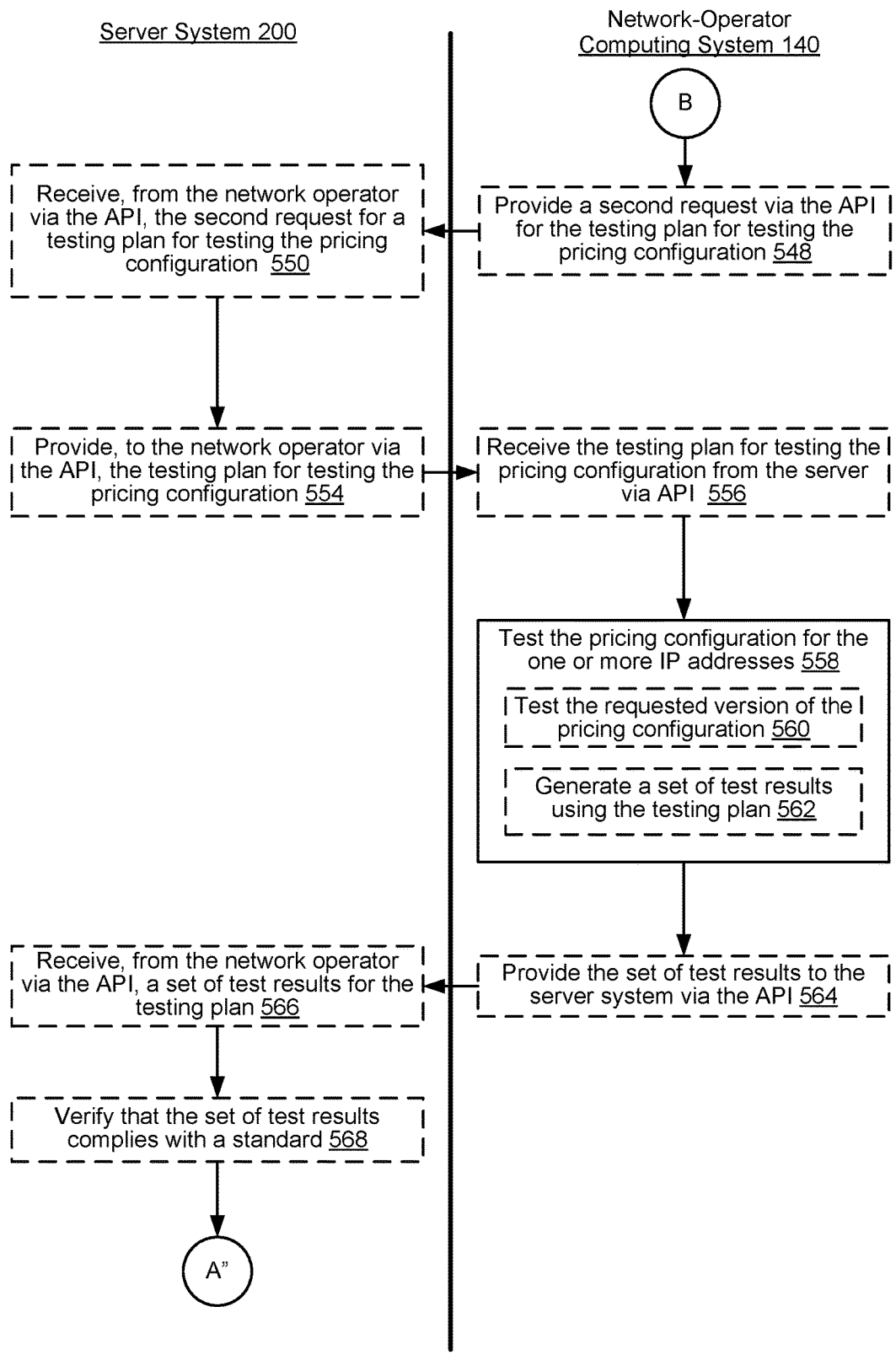
Figure 5E:
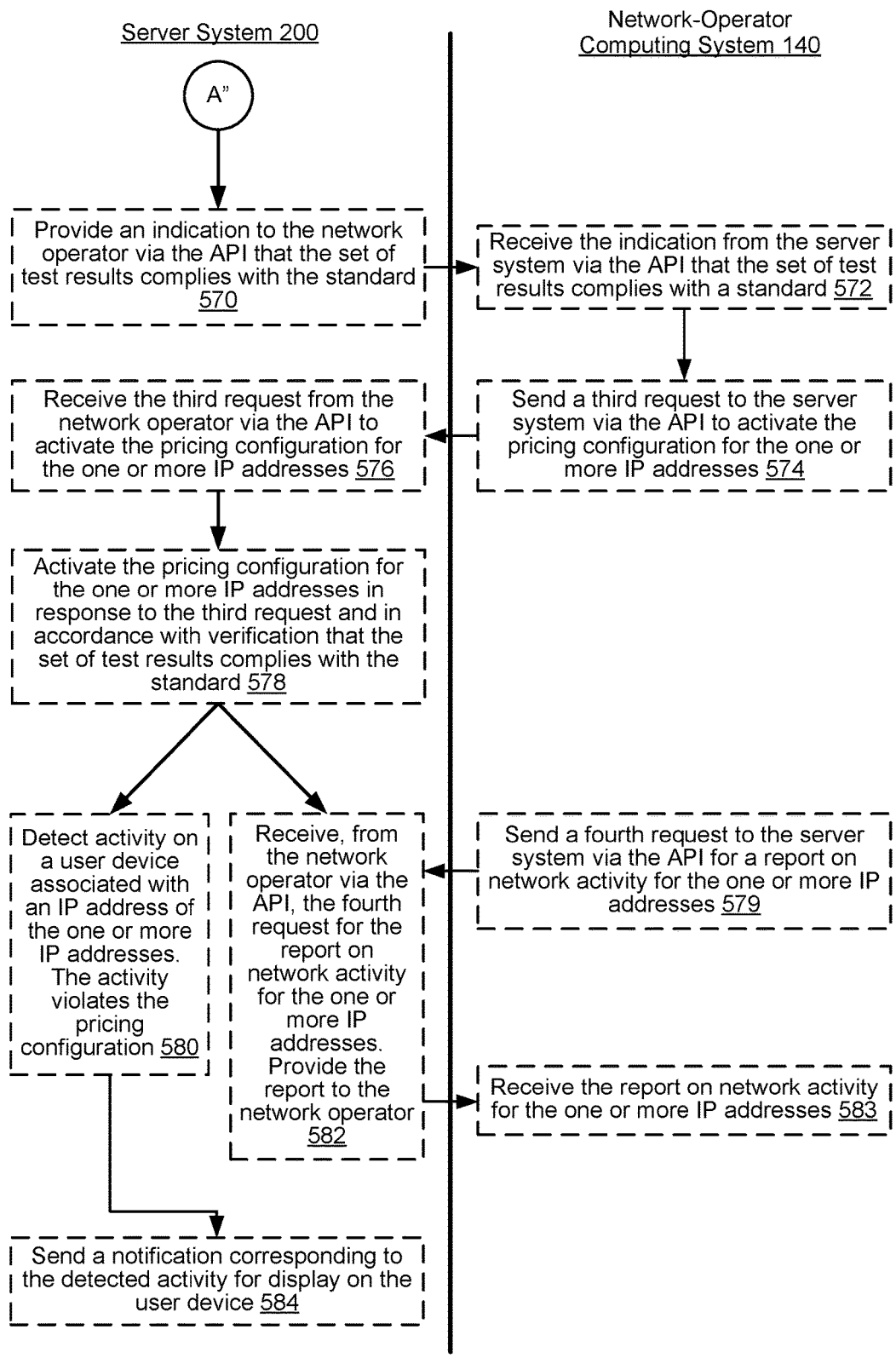

Memory 306 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 306 may optionally include one or more storage devices remotely located from the processor(s) 342. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 310 that includes procedures for handling various basic system services and for performing hardware-dependent tasks;
- a network communication module 312 that is used for connecting the network-operator computing system 140 to other computers via the one or more communication network interfaces 304 (wired or wireless) and one or more communication networks (e.g., the one or more networks 130, FIG. 1);
- a network service database 344 for storing data including:
  - pricing configurations 320, including for example, but not limited to:
    - IP addresses 322 for user devices and/or content sources;
    - domain names 324 with respective pricing for accessing content;
    - content sources 326 that provide content for retrieval by the user devices 102 with predetermined pricing;
    - content formats 327 with respective pricing;
    - content genres 328 with respective pricing; and/or
    - content distribution times 329 (e.g., peak hours and off-peak hours) with respective pricing; and
  - network operator management information 330 (e.g., network segment information, network type, IP addresses and/or IP address blocks hosted by the network operator, etc.);
- a request handling module 370 for handling and responding to requests from user devices 102, and for forwarding and routing requests or packets to corresponding web servers 150 and/or 152;
- a network service module 376 for providing network service (e.g., Free Basics service) with various pricing policies and related features (e.g., in conjunction with browser module 424 or application module 432 on the user device 102, FIG. 4);
- a testing module 380 for testing pricing configurations and generating corresponding sets of test results (e.g., using testing plans 232, FIG. 2); and
- an activation module 382 for activating or requesting activation of pricing configurations.

In some embodiments, the network service module 376 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments.

FIG. 4 is a block diagram illustrating an exemplary user device 102 (e.g., one of the user devices 102-1 through 102-i, FIG. 1) in accordance with some embodiments. The user device 102 typically includes one or more central processing units (CPU(s)) (e.g., processors or cores) 402, one or more network (or other communications) interfaces 410, memory 412, and one or more communication buses 414 for interconnecting these components. The communication buses 414 optionally include circuitry (sometimes called a chipset) that interconnects and controls communications between system components.

The user device 102 includes a user interface 404, including output device(s) 406 and input device(s) 408. In some embodiments, the input devices include a keyboard or a track pad. Alternatively, or in addition, the user interface 404 includes a display device that includes a touch-sensitive surface, in which case the display device is a touch-sensitive display. In user devices that have a touch-sensitive display, a physical keyboard is optional (e.g., a soft keyboard may be displayed when keyboard entry is needed). The output devices 406 also optionally include speakers and/or an audio output connection (i.e., audio jack) connected to speakers, earphones, or headphones. Optionally, the user device 102 includes an audio input device (e.g., a microphone) to capture audio (e.g., speech from a user). Furthermore, some user devices 102 use a microphone and voice recognition software to supplement or replace the keyboard. Optionally, the user device 102 includes a location-detection device, such as a global navigation satellite system (GNSS) (e.g., GPS, GLONASS, Galileo, BeiDou) or other geo-location receiver, and/or location-detection software for determining the location of the user device 102.

In some embodiments, the one or more network interfaces 410 include wireless and/or wired interfaces for receiving data from and/or transmitting data to other user devices 102, the network-operator computing system 140, the social network server system 150, the third-party servers 152, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, in some embodiments, the one or more network interfaces 410 includes a wireless LAN (WLAN) interface 411 for enabling data communications with other WLAN-compatible devices and/or the network-operator computing system 140 (via the one or more network(s) 130, FIG. 1).

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 402. Memory 412, or alternately, the non-volatile memory solid-state storage devices within memory 412, includes a non-transitory computer-readable storage medium. In some embodiments, memory 412 or the non-transitory computer-readable storage medium of memory 412 stores the following programs, modules, and data structures, or a subset or superset thereof:

- an operating system 416 that includes procedures for handling various basic system services and for performing hardware dependent tasks;

network communication module(s) 418 for connecting the user device 102 to other computing devices (e.g., the network-operator computing system 140, the social network server system 150, the third-party servers 152, other user devices 102, and/or other devices) via the one or more network interface(s) 410 (wired or wireless);

a user interface module 420 that receives commands and/or inputs from a user via the user interface 404 (e.g., from the input devices 408, which may include keyboards, touch screens, microphones, eye tracking components, three-dimensional gesture tracking components, and the like), and provides user interface objects and other outputs for display on the user interface 404 (e.g., the output devices 406, which may include a display screen, a touchscreen, a speaker, etc.);

a web browser module 424 (e.g., Internet Explorer or Edge by Microsoft, Firefox by Mozilla, Safari by Apple, Opera by Opera Software, or Chrome by Google) for accessing, viewing, and interacting with web sites (e.g., zero-rated and/or non-zero rated web sites);

one or more client application modules 430, including the following modules (or sets of instructions), or a subset or superset thereof:

a network service application module 432 for providing one or more functionalities related to network services provided by the network-operator computing system 140; and other optional client application modules 440, such as applications for social networking, word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support; and client database 450 for storing data associated with the network service platform, including, but is not limited to:

user data 452 storing user profile(s) and associated data of the user(s) of a client device 102 including, but not limited to, some or all of user account information, login credentials to the network service platform, payment data (e.g., linked credit card information, app credit or gift card balance, billing address, shipping address, etc.), bookmarked links (including zero-rated and/or non-zero rated), custom parameters (e.g., age, location, hobbies, etc.) of the user, contacts of the user, and identified trends and/or likes/dislikes of the user. For a given user, the user account information may include, for example, the user's name, profile picture, contact information, birth date, sex, marital status, family status, employment, education background, preferences, interests, and/or other demographic information.

Each of the above identified modules and applications correspond to a set of executable instructions for performing one or more functions as described above and/or in the methods described herein (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments.

FIGS. 5A-5E are flow diagrams illustrating a method 500 for implementing different pricing configurations in accordance with some embodiments. Respective steps of the method 500 are performed by the network-operator computing system 140 (FIGS. 1 and 3), a server system 200 (FIG. 2) (e.g., social network server system 150, FIG. 1), and a user device 102 (e.g., user device 102-1, FIGS. 1-2). Operations performed in method 500 correspond to instructions stored in computer memories (e.g., memory 206, FIG. 2; memory 306, FIG. 3; and memory 212, FIG. 4) or other computer-readable storage mediums.

In the method 500, the server system 200 provides 502 an API (e.g., API module 213, FIG. 2) for one or more network operators.

The network-operator computing system 140 sends 504, to a server system 200 that is independent of the network operator, via the API provided by the server system 200, a first request for a pricing configuration for network access for one or more IP addresses hosted by the network operator. The one or more IP addresses correspond, for example, to user devices 102 of users who are subscribers of the network operator. In some embodiments, the first request specifies 506 a requested version of the pricing configuration.

The server system 200 receives 508, from the network operator (i.e., from the network-operator computing system 140) via the API, the first request for a pricing configuration for network access for the one or more IP addresses hosted by the network operator. In some embodiments, the one or more IP addresses 510 comprise a block of IP addresses hosted by the network operator. In some embodiments, the pricing configuration specifies 512 prices selected from the group consisting of prices for respective content sources (e.g., pay-per-view, advertisers), prices for respective content formats (e.g., content file formats; content resolution/quality levels), prices for respective content genres (e.g., games, movies, audiobooks, etc.), and prices for respective content-distribution times (e.g., peak hours, off-peak hours).

In some embodiments, the first request includes 514 an authentication code determined (e.g., by the request-handling module 370 in the network-operator computing system 140, FIG. 3) using, for example, an identifier for the network operator and a timestamp of the first request. The server system 200 verifies 516 the authentication code.

In some embodiments, the first request specifies 518 a requested version of the pricing configuration.

The server system 200 retrieves 520 (FIG. 5B) the pricing configuration (e.g., from the pricing configurations 215 in the social network database 214, FIG. 2). In some embodiments, the server system 200 retrieves 522 the requested version of the pricing configuration.

The server system 200 provides 524 a response to the first request to the network operator via the API. The response comprises the pricing configuration. In some embodiments, the server system 200 provides 526 the response in response to verifying the authentication code (see step 516 of FIG. 5A). Verification is performed, for example, by the authentication module 217 (FIG. 2). In some embodiments, the server system 200 provides 528 the requested version of the pricing configuration to the network operator. The response may further comprise 530 a response code indicating successful retrieval of the requested version of the pricing configuration, a network-operator identifier for the network operator, a version identifier for the requested version of the pricing configuration, and/or a timestamp associated with the pricing configuration. In some embodiment, the server system 200 provides 532 a testing plan for testing the pricing configuration.

The network-operator computing system 140 receives 534 the response comprising the pricing configuration from the server system 200 via the API. In some embodiments, the network-operator computing system 140 receives 536 the requested version of the pricing configuration.

In some embodiments, the network-operator computing system 140 makes 536 (FIG. 5C) calls to the API at scheduled times. The API calls at the scheduled times request updates to the pricing configuration. For example, the network-operator computing system 140 sends a periodic (e.g., hourly, daily) request for updates on pricing configurations. These scheduled requests serve as a "heartbeat" that the server system 200 may monitor to ensure that the network-operator computing system 140 has up-to-date pricing configurations.

The server system 200 receives 538 the API calls at the scheduled times from the network operator. The API calls at the scheduled times request updates to the pricing configuration.

The server system 200 determines 540 that an API call requesting updates to the pricing configuration is not received from the network operator at a scheduled time. In response to this determination, the server system 200 identifies 542 an error condition for the network operator. The server system 200 provides 544 an indication of the error condition to the network operator.

The network-operator computing system 140 receives 546 the indication of the error condition. In response, the network operator may investigate the cause of the error condition.

In some embodiments, the network-operator computing system 140 provides 548 (FIG. 5D) a second request via the API for the testing plan for testing the pricing configuration, which the server system 200 receives 550 via the API. The server system 200 provides 554, to the network-operator computing system 140 via the API, the testing plan, which the network-operator computing system 140 receives 556. For example, the server system 200 retrieves the testing plan from the testing module 219 (FIG. 2) in response to the second request.

The network-operator computing system 140 uses the testing plan to test 558 the pricing configuration for the one or more IP addresses. In some embodiments, the network-operator computing system 140 tests 560 the requested version of the pricing configuration. In some embodiments, the network-operator computing system 140 generates 562 a set of test results using the testing plan.

The network-operator computing system 140 provides 564 the set of test results to the server system 200 via the API, and the server system 200 receives 566 the set of test results accordingly. The server system 200 verifies 568 (e.g., using testing module 219, FIG. 2) that the set of test results complies with a standard (e.g., matches expected results specified by the standard either precisely or to within a specified degree).

The server system 200 provides 570 (FIG. 5E), an indication to the network-operator computing system 140 via the API that the set of test results complies with the standard, which the network-operator computing system 140 receives 572.

The network-operator computing system 140 sends 574 a third request to the server system 200 via the API to activate the pricing configuration for the one or more IP addresses in response to the indication that the set of test results complies with the standard. The server system 200 receives 576 the third request and activates 578 the pricing configuration for the one or more IP addresses in response to the third request and in accordance with the verification 568 that the set of test results complies with the standard.

In some embodiments, the server system 200 detects 580 activity on a user device associated with an IP address of the one or more IP addresses. The activity violates the pricing configuration. The server system 200 sends 584 a notification corresponding to the detected activity for display on the user device. Additionally or alternatively, the server system 200 sends a notification to the network-operator computing system 140, which may send a warning message to the user, block the user, or disable the user's account in response.

In some embodiments, the network-operator computing system 140 sends 579 a fourth request to the server system 200 via the API for a report on network activity for the one or more IP addresses. The server system 200 receives 582 the fourth request from the network operator via the API and, in response provides 582 the report (e.g., as generated by the reporting module 221, FIG. 2) to the network operator (e.g., via the API). The network-operator computing system 140 receives 583 the report.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
at a server system having one or more processors and memory storing instructions for execution by the one or more processors:
providing an application programming interface (API) for one or more network operators to retrieve pricing configuration information;
receiving, from a network operator via the API, a first request for a pricing configuration for network access for one or more internet protocol (IP) addresses hosted by the network operator;
retrieving the pricing configuration;
providing a response to the first request to the network operator via the API, the response comprising the pricing configuration;
identifying a schedule of times for the network operator to request updates to the pricing configuration;
determining whether a call to the API requesting updates to the pricing configuration has been received from the network operator at a scheduled time;
in accordance with determining that the API call has not been received at the scheduled time, identifying an error condition for the network operator and providing an indication of the error condition to the network operator; and in accordance with determining that the API call has been received at the scheduled time, retrieving an updated pricing configuration for the network operator and providing a response to the network operator via the API, the response comprising the updated pricing configuration.

2. The method of claim 1, wherein the one or more IP addresses comprise a block of IP addresses hosted by the network operator.

3. The method of claim 1, wherein the pricing configuration specifies prices selected from the group consisting of prices for respective content sources, prices for respective content formats, prices for respective content genres, and prices for respective content-distribution times.

4. The method of claim 1, wherein:
the received API call at the scheduled time includes an authentication code determined using an identifier for the network operator and a timestamp of the received API call;
the method further comprises, at the server system, verifying the authentication code; and
providing the response is performed in response to verifying the authentication code.

5. The method of claim 1, wherein:
the received API call at the scheduled time specifies a requested version of the pricing configuration;
retrieving the updated pricing configuration comprises retrieving the requested version of the pricing configuration; and
providing the response comprises providing the requested version of the pricing configuration to the network operator.

6. The method of claim 5, wherein the response further comprises:

a response code indicating successful retrieval of the requested version of the pricing configuration;
a network-operator identifier for the network operator;
a version identifier for the requested version of the pricing configuration; and
a timestamp associated with the pricing configuration.

7. The method of claim 1, further comprising:
detecting activity on a user device associated with an IP address of the one or more IP addresses, wherein the activity violates the updated pricing configuration; and
sending a notification corresponding to the detected activity for display on the user device.

8. A method, comprising:
at a computing system of a network operator, the computing system having one or more processors and memory storing instructions for execution by the one or more processors:
sending a plurality of requests for updates to a pricing configuration for network access for one or more internet protocol (IP) addresses hosted by the network operator, wherein each request of the plurality of requests is sent at a respective scheduled time to a server system that is independent of the network operator, using an application programming interface (API) provided by the server system;
in response to each request of the plurality of requests for an update to the pricing configuration, receiving a respective updated pricing configuration from the server system via the API.

9. The method of claim 8, wherein the pricing configuration specifies prices selected from the group consisting of prices for respective content sources, prices for respective content formats, prices for respective content genres, and prices for respective content-distribution times.

* * * * *